United States Patent [19]

Arseneau

[11] Patent Number: 4,475,042
[45] Date of Patent: Oct. 2, 1984

[54] DYNAMIC THRESHOLD FOR SCINTILLATION CAMERA

[75] Inventor: Roger E. Arseneau, Arlington Heights, Ill.

[73] Assignee: Siemens Gammasonics, Inc., Des Plaines, Ill.

[21] Appl. No.: 273,916

[22] Filed: Jun. 15, 1981

[51] Int. Cl.³ .............................................. G01T 1/20
[52] U.S. Cl. ................................ 250/363 S; 250/369
[58] Field of Search ................. 250/363 R, 363 S, 366, 250/369

[56] References Cited

U.S. PATENT DOCUMENTS

| | | | |
|---|---|---|---|
| 3,011,057 | 11/1961 | Anger | 250/363 S |
| 3,732,419 | 5/1973 | Kulberg et al. | 250/369 |
| 3,984,689 | 10/1976 | Arseneau | 250/369 |
| 4,071,762 | 1/1978 | Lange et al. | 250/369 |
| 4,142,102 | 2/1979 | Lange | 250/369 |

*Primary Examiner*—Janice A. Howell
*Attorney, Agent, or Firm*—Karl F. Milde, Jr.

[57] ABSTRACT

An improved threshold preamplifier circuit is disclosed for use with the event X, Y position detection circuitry of a scintillation camera. Threshold amplifiers, having a common threshold voltage that is set as a function of the energy of the incident scintillation event, control the respective preamplified photomultiplier tube output signals so that signals from tubes close to the event receive greater weight in the X, Y position analysis than signals from distant tubes. In a preferred embodiment, the threshold voltage is determined by the output of a summing amplifier which sums an unthresholded energy signal $Z_{nt}$ which represents the total energy of the incident event, an integrated energy signal $Z_u$ which represents the integrated value of the unthresholded energy signal $Z_{nt}$, and a constant voltage which represents the preselected zero energy level threshold biasing voltage. Variable resistors control the relative contributions to the summing amplifier input of the $Z_{nt}$ and $Z_u$ energy signals. The invention overcomes the shortcoming of prior art constant threshold voltage circuits that the size of displayed images (determined by the computation of $\overline{X}$, $\overline{Y}$ ratios using thresholded energy signals $Z_t$) varies for detection of events caused by multiple energy isotopes and dual isotopes with different energies.

10 Claims, 8 Drawing Figures

DYNAMIC THRESHOLD FOR SCINTILLATION CAMERA

BACKGROUND OF THE INVENTION

1. Field of the Invention

This invention relates to an improved threshold preamplifier circuit for use in a scintillation camera.

2. Description of the Prior Art

Scintillation cameras are widely used as diagnostic tools for analyzing the distribution of a radiation-emitting substance in an object under study, such as for the medical diagnosis of a human body organ. A typical scintillation camera of a type to which the present invention is applicable is a commercial version of the Anger-type scintillation camera, the basic principles of which are described in U.S. Pat. No. 3,011,057.

The scintillation camera can take a "picture" of the distribution of radioactivity throughout an object under investigation, such as an organ of the human body which has taken up a diagnostic quantity of a radioactive isotope. A scintillation camera of the Anger-type produces a picture of the radioactivity distribution by detecting individual gamma rays emitted from the distributed radioactivity in the object and passing through a collimator to produce a scintillation in a thin planar scintillation crystal. The scintillation is detected by a bank of individual photomultiplier tubes which view overlapping areas of the crystal. Appropriate electronic circuits translate the outputs of the individual photomultiplier tubes into X and Y positional coordinate signals and a Z signal which indicates generally the energy of the scintillation event and is used to determine whether the event falls within a preselected energy window. A picture of the radioactivity distribution in the object may be obtained by coupling the X and Y signals which fall within the preselected energy window to a display, such as a cathode ray oscilloscope which displays the individual scintillation events as spots positioned in accordance with the coordinate signals. The detection circuitry typically provides for integrating a large number of spots onto photographic film.

The "resolution" of a scintillation camera refers to the degree of ability of the camera faithfully to reproduce the spatial distribution of the radioactivity which is within the field of view of the device. The overall intrinsic resolution of the Anger camera detector is generally dependent on the ability of the detector to signal accurately the position coordinates of each scintillation event. There are many operations involved in the detection of each scintillation event and the signalling of its position coordinates. It has been found that the information contributed by photomultiplier tubes distant from the location of a scintillation event is substantially less accurate than that contributed by near tubes because it is based on relatively few photons arising from the scintillation event. The error or inaccuracy is compounded by the long "lever arm" associated with the distant tubes. Thus, a threshold preamplifier circuit has been developed, as described in U.S. Pat. No. 3,732,419 for improving the resolution of a scintillation camera by giving greater weight to the signals from tubes close to the location of a scintillation event than to signals from photomultiplier tubes which are more distant. This non-linear amplification scheme is accomplished by providing a threshold preamplifier circuit which has an input-output transfer characteristic such that input signals at a magnitude more than a preselected threshold magnitude produce substantially no output signal and input signals of a magnitude greater than the preselected threshold magnitude produce an amplified output signal which is substantially proportional to the magnitude of the input signal above the threshold magnitude. In conventional circuits of this type, the threshold value is selected as a constant voltage chosen as a percentage (typically one percent) of the anticipated peak of the energy for the isotope under study.

The threshold is applied to the output of each photomultiplier tube, to reduce the effect on the coordinate positioning analysis of signals received from tubes which are distant from the location of the scintillation event in the crystal. When the threshold is applied to the output of each tube, the X and Y signals change very little because the thresholding amplifiers remove a small (a light that was reflected many times) amount of signal from both sides of the axis, which cancels out in the differential summing. The Z channel after thresholding, however, which comprises the sum of all the energy signal outputs from the photomultiplier tubes can change a great deal as compared with the unthresholded Z output as the thresholding setting is changed. This causes an increase in X and Y position gain as threshold is increased. While this difference can be compensated for where a single isotope energy is being studied, difficulties arise where more than one energy source is being received. Where dual isotopes are being studied, the threshold in conventional systems is set to a single constant value as determined by the energy of the lowest energy isotope to be used. This causes the image size for the higher energy isotope incidence to be changed when used at the same time with a lower energy isotope or an isotope with multiple peaks.

SUMMARY OF THE INVENTION

The present invention provides an improved threshold preamplifier circuit for a scintillation camera including means for varying the threshold value setting in accordance with the incident energy of the scintillation event.

In a preferred embodiment of this invention, this circuit means is a dynamic threshold preamplifier circuit in which the summed and integrated unthresholded outputs of the preamplifier are used to adjust the threshold on the thresholded output of the preamplifiers to provide a threshold that is proportional to the energy of the event being processed, thereby giving a constant image size for all energies.

There have thus been outlined rather broadly certain objects, features and advantages of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as a basis for the designing of other arrangments for carrying out the purposes of this invention. It is important, therefore, that this disclosure be regarded as including such equivalent arrangements as do not depart from the spirit and scope of the invention.

BRIEF DESCRIPTION OF THE DRAWINGS

An embodiment of the invention has been chosen for purposes of illustration and description, and is shown in the accompanying drawings forming a part of the specification, wherein.

DESCRIPTION OF THE PREFERRED EMBODIMENT

Figure 1A:
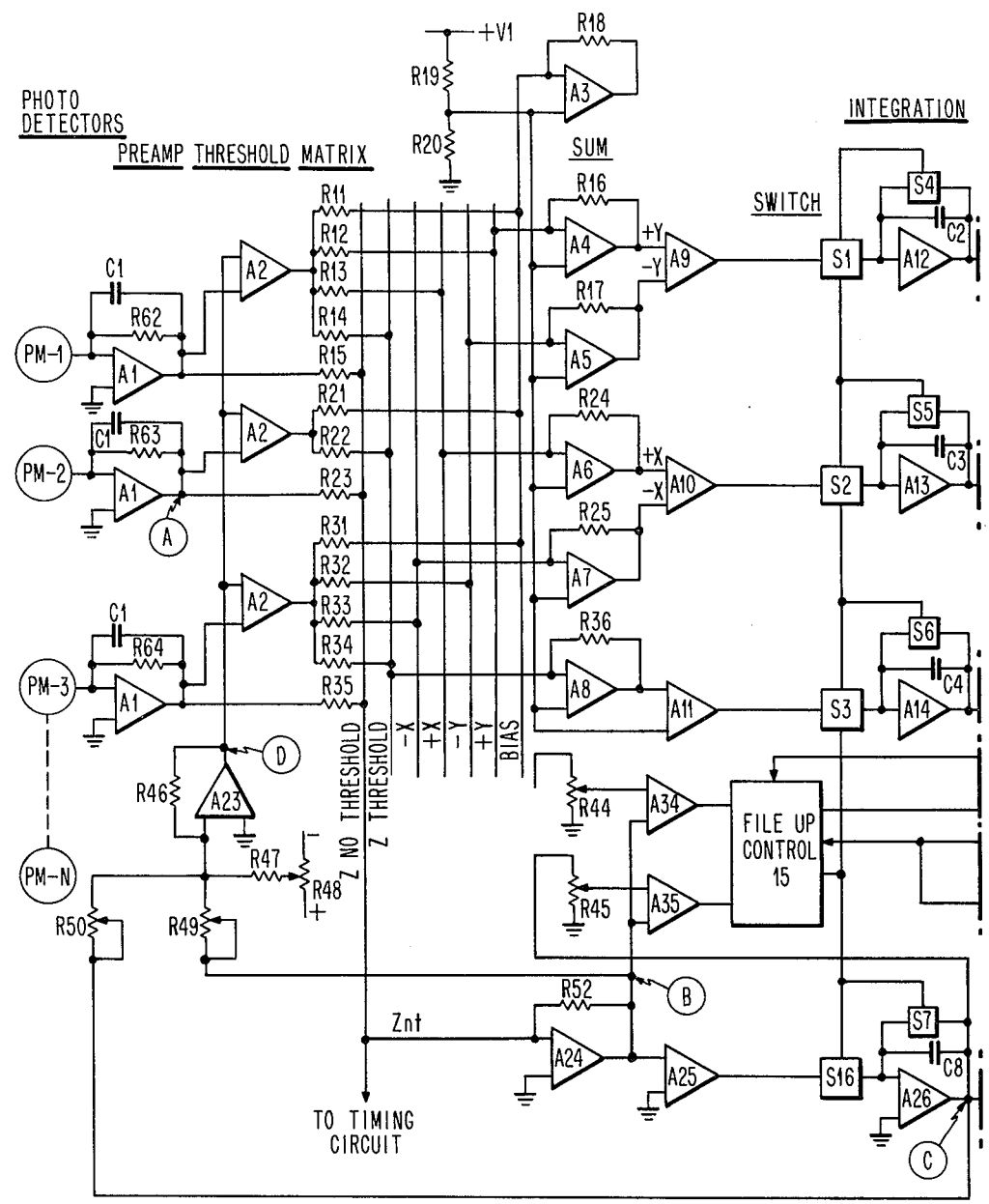
FIG. 1 is a combination of FIGS. 1A and 1B which are schematic circuit diagrams of the electronics of an Anger-type scintillation camera incorporating dynamic threshold circuitry according to the invention.
Figure 1B:
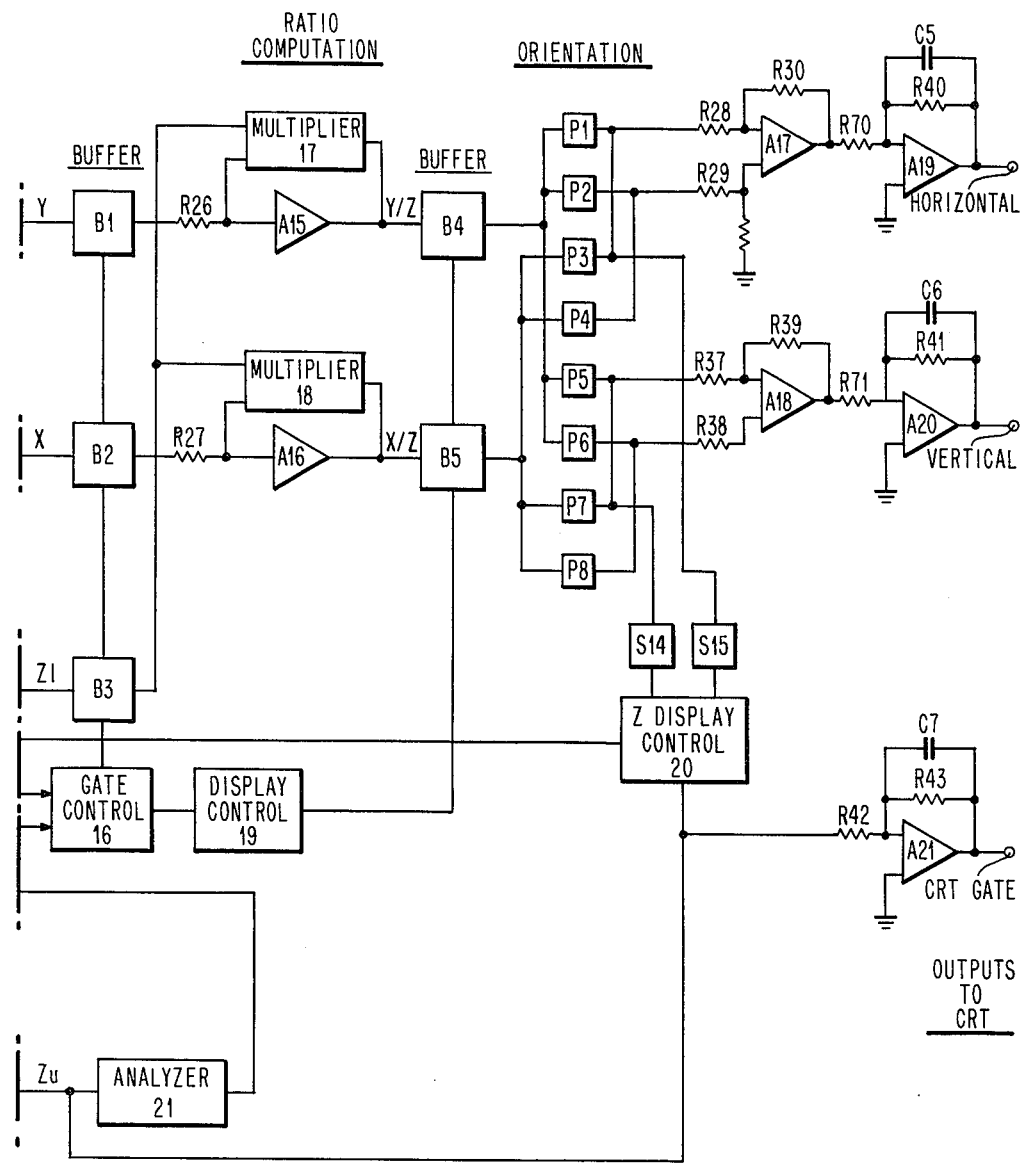

With reference to FIG. 1, an Anger-type scintillation camera has a plurality of photomultiplier tubes PM-1 through PM-N (typically 19 or 37 tubes mounted in a hexagonal array behind a scintillation crystal) which function together to detect the scintillation event that occurs when a gamma ray impinges on the scintillation crystal (the tubes PM-1 through PM-N are labelled "PHOTO DETECTORS" in FIG. 1). For purposes of simplification, only the circuitry associated with the first three photomultiplier tubes PM-1, PM-2 and PM-3 is illustrated in detail in FIG. 1. The details of the circuitry of FIG. 1 are described only insofar as they contribute to an understanding of the principles, structure and operation of the claimed invention which relates to the preamplifier and threshold portions of FIG. 1. The reader is referred to U.S. Pat. Nos. 3,011,057 and 3,984,689 for further details of the more conventional aspects of the illustrated circuitry.

The outputs of the respective photomultiplier tubes PM-1 through PM-N are separately coupled to respectively corresponding preamplifier circuits A1 ("PRE-AMP"). Each preamplifier circuit A1 has an output coupled to a separate threshold amplifier circuit A2 ("THRESHOLD"). Each of the threshold amplifiers A2 subtracts a prerequisite threshold voltage from the output of the particular preamplifier A1 with which it is associated. The threshold voltage is established as a function of the energy of the incoming scintillation event, as more fully described below. An amplifier A23 with a feedback loop employing a resistor R46 supplies a threshold bias to the threshold amplifiers A2. The outputs from the respective threshold amplifiers A2 are applied to a resistor matrix ("MATRIX") and are used for generating an actual displacement of an electron beam on a cathode ray tube (CRT) display.

The preamplifiers A1 also have outputs, connected through resistors R15, R23 and R35 directly to a "Z NO THRESHOLD" signal line of the resistor matrix, that are summed to provide an unthresholded energy signal $Z_{nt}$ which represents the total energy of the scintillation event. The unthresholded energy signal $Z_{nt}$ is passed through amplifiers A24 and A25 to an integrating amplifier A26, to provide an integrated energy signal $Z_u$. The integrated signal $Z_u$ is delivered as an input to an analyzer 21 which looks at the signal $Z_u$ to see if it falls within a preselected energy window.

The signal $Z_u$ is also connected through a variable resistor R50 to serve as an input to a summing amplifier A23. The unthresholded output $Z_{nt}$, after passing through amplifier A24 and variable resistor R49, also connects as an input to the summing amplifier A23. A third input to the amplifier A23 comes from the resistor R47 which is variable connected to resistor R48 to provide a preselected constant biasing voltage. The output of the summing amplifier A23 is the sum of the unthresholded energy signal $Z_{nt}$ amplified by amplifier A24, the integrated unthresholded energy signal $Z_u$ and the preset constant voltage determined by the resistors R47 and R48. This summed signal provides a threshold voltage signal which is applied to the threshold amplifiers A2.

The threshold amplifiers A2 operate to pass the preamplifier A1 output signals to the resistor matrix ("MATRIX") and summing amplifiers A4 through A8 ("SUM") whenever the output signal from the corresponding preamplifier A1 exceeds the value of the threshold voltage. If the output of any of the respective preamplifiers A1 is below the threshold, the output signal of the corresponding threshold amplifier A2 is substantially zero.

In this manner, the larger output signals of the photomultiplier tubes PM-1 through PM-N closest to the location of the scintillation event are passed to the resistor matrix ("MATRIX") and summing amplifiers A4 through A8 ("SUM") for determination of the X, Y positional coordinate signals of the scintillation event. The smaller output signals which come from photomultiplier tubes PM-1 through PM-N which are distant from the location of the scintillation event are not passed to the resistor matrix, and are thus not considered in the statistical analysis which determines the position of the event. From the thresholded preamplifier A1 outputs, the resistor matrix and summing amplifiers A4 through A8 develop positional coordinate output signals +Y, −Y, +X, −X, and a thresholded energy signal $Z_t$. The +Y, −Y and +X, −X outputs are fed to differential amplifiers A9 and A10 respectively, where the +Y and −Y signals and the +X and −X signals are subtracted. The $Z_t$ output is fed to the amplifier A11. The resulting signals are then passed to integrating amplifiers A12, A13 and A14 ("INTEGRATION").

As already stated, the analyzer 21 looks at the $Z_u$ signal to see if the energy of the event falls within the preselected energy window. If the value of $Z_u$ is within the acceptable range, the analyzer 21 actuates the gate control circuit 16 which opens gates to the sample and hold circuits B1, B2 and B3 ("BUFFER"), thereby permitting the integrated signals from integrating amplifiers A12, A13 and A14 ("INTEGRATION") to be processed further. (If no actuating signal is received, switches S4, S5 and S6 apply discharge signals to the ingetrating circuits to prevent further processing.) The integrated X, Y and $Z_t$ signals are then applied to ratio computation circuitry (amplifiers A15, A16 and multipliers 17, 18 labelled "RATIO COMPUTATION" in FIG. 1) where the X and Y signals are divided by the thresholded energy signal $Z_t$ to produce $\overline{X}$ and $\overline{Y}$ positional coordinate signals for the image event. The $\overline{X}$ and $\overline{Y}$ signals are then passed to the CRT display.

Figure 2A:
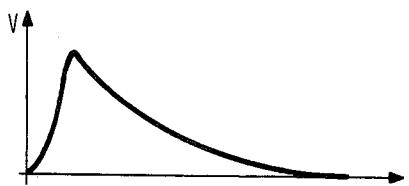
FIGS. 2A–2D show representative voltage waveforms at points A–D of FIG. 2.

For every scintillation event whose $Z_u$ signal falls within the preselected energy window, the CRT display produces a spot on a screen at a location corresponding to the input position coordinates $\overline{X}$ and $\overline{Y}$ received from the ratio computation circuitry. The orientation switches P1 through P8 ensure that the correct orientation exists with regard to the $\overline{X}$ and $\overline{Y}$ deflection signals. The voltage waveform of a representative output signal from a preamplifier A1 at a point "A" in FIG. 1 caused by the detection of a scintillation event is shown in FIG. 2A. This signal, and all similar signals delivered at the outputs of the respective preamplifiers A1 of photomulipier tubes PM-1 through PM-N in response to detection of the event, is passed through the connecting resistor (R23 for PM-2) to the "Z NO THRESHOLD" signal line of the resistor matrix ("MATRIX"). The signals are summed together to give an unthresholded energy reference signal $Z_{nt}$, corresponding to the total energy of the incident scintillation event. The voltage waveform of the $Z_{nt}$ signal has the same shape as the signal of FIG. 2A, being the sum of the separate unthresholded preamplifier A1 output signals.

Figure 2B:
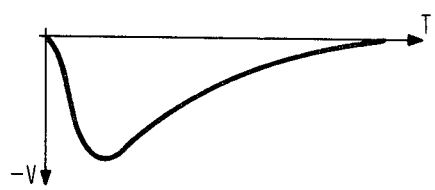
Figure 2C:
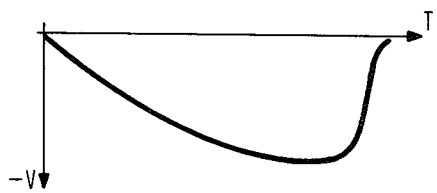

This unthresholded energy signal $Z_{nt}$ is applied to the inverting input of the amplifier A24 with associated feedback resistor R52 and produces an output signal proportional to the total energy of the image event. FIG. 2B shows the voltage waveform of a representative signal appearing at point "B" of FIG. 1 in response to detection of an event. The voltage waveform of the signals at points "A" and "B" (FIGS. 2A and 2B) are similar, except that the signal at point "B" is inverted. The signal at point "B" is thereafter applied as an input to the amplifier A25 and to the integrator A26, which has associated feedback capacitor C8 and discharging switch S7, to generate an integrated energy output signal $Z_u$. The voltage waveform for a representative $Z_u$ signal taken at a point "C" of FIG. 1 is shown in FIG. 2C.

Figure 2D:
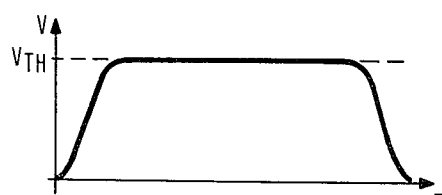

The unthresholded energy output signal of the amplifier 24 and the integrated energy output signal of the integrator 26 are added to each other by the summing amplifier A23 which has feedback resistor R46. The summed output signal of amplifier A23 serves as the threshold voltage signal which is applied as a reference voltage to the separate threshold amplifiers A2. The voltage waveform of a representative threshold voltage output of amplifier A23 taken at a point "D" in FIG. 1 is shown in FIG. 2D. "$V_{TH}$" indicates the threshold voltage value.

The variable resistors R49 and R50 respectively serve as a means for adjusting the relative contributions of the unthresholded energy signal (output of amplifier A24) and the integrated energy signal (output of integrator A26) to the threshold voltage signal output of amplifier A23. The resistors R47 and R48 provide a preselected constant biasing voltage input to the voltage sum output of amplifier A23 and serve to set the zero image energy level threshold value. The resistors R47 to R50 are typically set to give a zero energy level bias of 6.9 volts and a threshold pulse of approximately one to two percent of the peak output of the preamplifiers A1.

Figure 3:
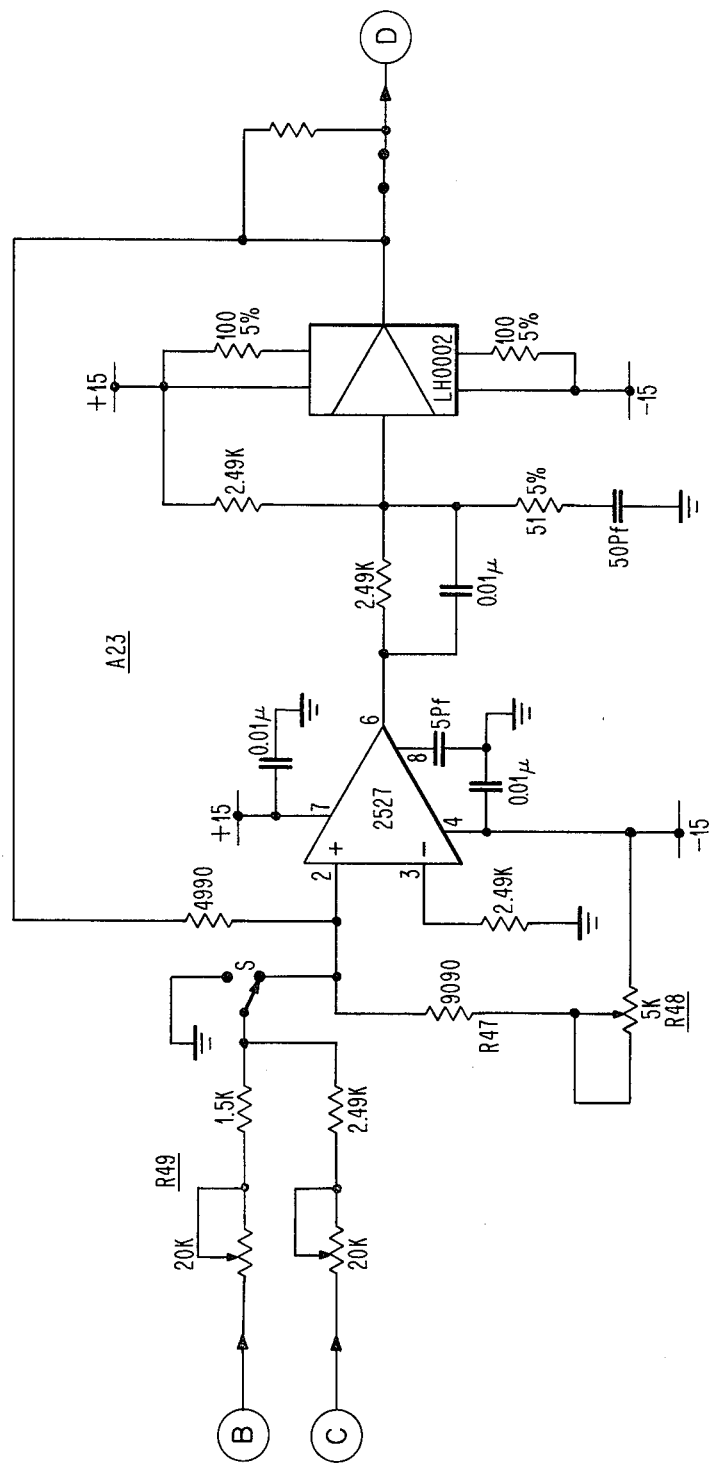
FIG. 3 is a detailed circuit diagram of part of FIG. 1.

FIG. 3 shows the detailed configuration of the summing amplifier A23 and associated circuit components R47 through R50. The structure shown in FIG. 3 can be formed as part of an integrated circuit board layout including other circuitry shown in FIG. 1. The preferred amplifier component is a 2527 operational amplifier such as commercially available from Harris Corporation. However, those skilled in the art will appreciate that any fast operational amplifier or discrete transistor may be used. An LH0002 power buffer, such as available from National Semiconductor Corporation, is used at the output of the 2527 amplifier to provide low impedance to drive the common threshold inputs of the threshold amplifiers A2. The unthresholded energy signal $Z_{nt}$ (amplified by amplifier A24) that appears at point "B" in FIG. 1 (see FIG. 2B for voltage waveform) is applied through a 20K ohm variable resistor and 1.5K ohm fixed resistor (together the resistor R49 of FIG. 1) to the inverting input of the 2527 amplifier. The integrated energy signal $Z_u$ that appears at point "C" in FIG. 1 (see FIG. 2C) is likewise applied through a 20K ohm variable resistor and a 2.49K ohm fixed resistor (together R50 of FIG. 1) to the inverting input of the 2527 amplifier. A switch "S" serves to permit optional removal of these incident event energy dependent components from the threshold voltage calculation. The constant biasing voltage input to the inverting input of the 2527 amplifier is provided through a variable 5K ohm resistor (R 48 of FIG. 1) and a fixed 9090 resistor (R47 of FIG. 1). The output of the LH0002 power buffer stage serves as the threshold voltage setting signal at point "D" in FIG. 1 (see FIG. 2D) which is applied to the threshold amplifiers A2.

Conventional scintillation camera detection circuits have thresholding components that serve to process the signals received from photomultiplier tubes close to the scintillation event with greater weight than the signals received from photomultiplier tubes which are distant from the event. Such thresholding components operate with respect to a constant threshold reference voltage which is preset at a value, such as one to two percent of the anticipated peak amplitude of the preamplifiers (as determined by the incident energy of events of the lowest energy isotope expected to be used). With the tresholded value set in this manner, however, the threshold energy reference $Z_t$ signal (the sum of the thresholded energy outputs of the separate preamplifiers) for scintillation events caused by isotopes of different energies can vary by as much as 15 to 20 percent. This causes undesired errors in depicting the position of each event on a display, since the positional reference signals $\overline{X}$ and $\overline{Y}$ are determined by dividing the positional coordinates X and Y by the thresholded energy sum signal $Z_t$. The invention provides means for setting the threshold value of the threshold components of the detection circuitry in response to the incident energy of the scintillation event, thereby providing a dynamic threshold which overcomes the disadvantages of the fixed threshold of prior art devices.

Having thus described the invention with particular reference to the preferred form of circuitry, it will obvious to those skilled in the art to which the invention pertains, after understanding the invention, that various changes and modifications may be made therein without departing from the spirit and scope of the invention as defined by the claims appended hereto.

What is claimed is:

1. In an improved threshold circuit for a scintillation camera which includes a plurality of photodetectors arranged to view overlapping areas of a crystal, detection circuitry for determining the position on the crystal of a scintillation event and threshold circuitry responsive to a threshold value setting for controlling the processing of the photodetector output signals by the detection circuitry so that signals from photodetectors close to the event are given greater weight in the event position determining analysis than signals from photodetectors distant from the event, the improvement comprising means for setting the threshold value in accordance with the energy of the incident scintillation event.

2. A circuit as defined in claim 1, wherein the threshold value setting means comprises means for setting the threshold value as a function of both an unthresholded energy signal which represents the total energy of the event and an integrated energy signal which represents the integrated value of the unthresholded energy signal.

3. A circuit as defined in claim 2, wherein the threshold value setting means comprises a summing amplifier for summing inputs proportional to the unthresholded energy signal and the integrated energy signal to produce an output signal which serves as the threshold value.

4. A circuit as defined in claim 3, further comprising means for selectively adjusting the relative contributions of the unthresholded energy signal and the integrated energy signal to the threshold value.

5. A circuit as defined in claim 2, wherein the threshold value setting means further comprises means for setting the threshold value also as a function of a preselected constant voltage which represents a zero energy level threshold biasing voltage.

6. A circuit as defined in claim 5, wherein the threshold value setting means comprises a summing amplifier for summing inputs proportional to the unthresholded energy signal, the integrated energy signal and the preselected constant voltage.

7. A scintillation camera comprising a crystal;
a plurality of photomultiplier tubes arranged to view overlapping areas of the crystal;
a plurality of preamplifiers, each connected to receive and preamplify electrical output signals from a separate one of the photomultiplier tubes upon the occurrence of a scintillation event on the crystal;
event position calculation circuitry for calculating the position on the crystal of the event on the basis of the preamplified output signals of the photomultiplier tubes; and
means responsive to the sum of the preamplified output signals from all the photomultiplier tubes for controlling input of the preamplified output signals to the circuitry so that signals from photomultiplier tubes close to the event are given greater weight than signals from photomultiplier tubes distant from the event.

8. A camera as defined in claim 7, wherein the control means comprises a plurality of threshold amplifiers, each connected between a separate preamplifier and the circuitry for passing the respective preamplified output signals to the circuitry in accordance with a common threshold value which is variable as a function of the sum of the preamplified output signals.

9. A camera as defined in claim 8, wherein the control means further comprises a summing amplifier connected to receive a first input which is proportional to the sum of the preamplified output signals and a second input which is proportional to the integrated value of the sum of the preamplified output signals, and whose output signal provides the common threshold value which is applied to the threshold amplifiers.

10. A camera as defined in claim 9, wherein the summing amplifier is further connected to receive a third input that has a constant voltage which is proportional to a preselected zero energy level threshold bias.

* * * * *